US009505498B2

(12) United States Patent
Hlavka et al.

(10) Patent No.: US 9,505,498 B2
(45) Date of Patent: Nov. 29, 2016

(54) AIRCRAFT CABIN AIRFLOW NOZZLES AND ASSOCIATED SYSTEMS AND METHODS

(75) Inventors: Brian D. Hlavka, Mukilteo, WA (US); Jody H. Pattie, Marysville, WA (US)

(73) Assignee: The Boeing Company, Chicago, IL (US)

( * ) Notice: Subject to any disclaimer, the term of this patent is extended or adjusted under 35 U.S.C. 154(b) by 1706 days.

(21) Appl. No.: 11/848,769

(22) Filed: Aug. 31, 2007

(65) Prior Publication Data
US 2009/0061754 A1 Mar. 5, 2009

(51) Int. Cl.
*B64D 13/06* (2006.01)
*B64D 13/00* (2006.01)

(52) U.S. Cl.
CPC ....... *B64D 13/00* (2013.01); *B64D 2013/0625* (2013.01)

(58) Field of Classification Search
CPC ..................................................... B64D 13/06
USPC .............................. 454/71, 76, 73; 244/118.5
See application file for complete search history.

(56) References Cited

U.S. PATENT DOCUMENTS

| | | | | |
|---|---|---|---|---|
| 2,613,587 | A * | 10/1952 | MacCracken | 454/264 |
| 3,687,054 | A | 8/1972 | Boberg | |
| 3,689,054 | A * | 9/1972 | Rene Gouirand | 267/68 |
| 4,132,240 | A * | 1/1979 | Frantz | 137/15.1 |
| 4,155,221 | A * | 5/1979 | Dhoore et al. | 60/226.1 |
| 4,742,760 | A * | 5/1988 | Horstman et al. | 454/76 |
| 5,474,120 | A * | 12/1995 | Severson et al. | 165/296 |
| 5,518,448 | A * | 5/1996 | Madoglio et al. | 454/108 |
| 5,567,230 | A * | 10/1996 | Sinclair | 95/273 |
| 6,019,315 | A * | 2/2000 | Scherer et al. | 244/129.5 |
| 6,189,831 | B1 * | 2/2001 | Asai et al. | 244/118.5 |
| 6,413,159 | B1 * | 7/2002 | Bates et al. | 454/76 |
| 7,037,187 | B2 * | 5/2006 | Butera et al. | 454/76 |
| 7,455,263 | B2 * | 11/2008 | Lau et al. | 244/118.5 |
| 7,789,346 | B2 * | 9/2010 | Horstman et al. | 244/118.5 |
| 7,980,928 | B2 * | 7/2011 | Markwart et al. | 454/76 |
| 8,113,195 | B2 * | 2/2012 | Heinrich et al. | 128/203.13 |
| 8,936,671 | B2 * | 1/2015 | Horstman et al. | 95/273 |
| 2007/0042701 | A1 | 2/2007 | Meckes et al. | |
| 2007/0111650 | A1 * | 5/2007 | Lerche | 454/75 |
| 2008/0139100 | A1 * | 6/2008 | Horstman et al. | 454/76 |

FOREIGN PATENT DOCUMENTS

EP 0301606 2/1989
FR 2802894 6/2001

* cited by examiner

*Primary Examiner* — Steven B McAllister
*Assistant Examiner* — Samantha Miller
(74) *Attorney, Agent, or Firm* — Perkins Coie LLP

(57) ABSTRACT

Aircraft cabin airflow nozzles and associated systems and methods are disclosed. A system in accordance with a particular embodiment includes a cabin air nozzle that in turn has a first passageway bounded at least in part by a first wall portion and a second wall portion spaced apart from the first wall portion. The second wall portion can have a first surface exposed to air within the first passageway, and a second surface facing away from the first surface. The first passageway can have an exit between the first and second wall portions, and the second passageway can be positioned to direct air along the second surface of the wall portion.

12 Claims, 4 Drawing Sheets

AIRCRAFT CABIN AIRFLOW NOZZLES AND ASSOCIATED SYSTEMS AND METHODS

TECHNICAL FIELD

The present disclosure is directed generally to aircraft cabin airflow nozzles and associated systems and methods, including systems and methods for reducing or eliminating condensation on nozzle surfaces.

BACKGROUND

Commercial passenger jets include passenger cabins specifically designed for passenger safety and comfort. Accordingly, the cabins are pressurized and include provisions for distributing compressed air throughout the passenger seating areas. These provisions include passenger-controlled air nozzles, typically located over each passenger seat, and general distribution nozzles, typically located along the interior walls of the aircraft.

FIG. 1 schematically illustrates a general distribution nozzle 20 configured in accordance with the prior art. The nozzle 20 is positioned inwardly from a cabin wall 10 of the aircraft, and above a passenger seat 11. The nozzle 20 includes a first wall 22a and a second wall 22b, both shaped to direct cool, dry air inwardly over the passenger seating area.

One potential drawback with the arrangement shown in FIG. 1 is that, when the air within the passenger cabin has a high level of humidity, the presence of cool dry air in the nozzle 20 can cause condensation to form on the second wall 22b. One approach to addressing this potential problem is to provide a layer of insulation 31 (shown in dashed lines) on the downwardly facing portion of the second wall 22b. However, a drawback with this approach is that it adds weight to the nozzle 20 and may also detract from the appearance of the nozzle 20, which is visible to a passenger P below. Accordingly, there remains a need for improved cabin air distribution nozzle systems.

SUMMARY

The following summary is provided for the benefit of the reader only, and is not intended to limit in any way the invention as set forth by the claims. Aspects of the present disclosure are directed to aircraft systems that include a cabin air nozzle, which in turn includes a first air passageway bounded at least in part by a first wall portion and a second wall portion spaced apart from the first wall portion. The second wall portion can have a first surface exposed to air in the first passageway, and a second surface facing away from the first surface. The first passageway can have an exit between the first and second wall portions. The cabin air nozzle can further include a second air passageway positioned to direct air along the second surface of the second wall portion. For example, in particular embodiments, the second air passageway is bounded at least in part by the second surface of the second wall portion, and by a third wall portion spaced apart from the second surface. In other embodiments, the second air passageway includes multiple openings extending through the second wall portion. In still further embodiments, the second air passageway has a second exit that is positioned to direct air along a curved and inwardly extending region of the second surface, and the first and second air passageways are coupled to a common flow passage.

Other aspects of the disclosure are directed to methods for introducing air into an aircraft cabin. One such method includes directing a first flow of air through an exit of a nozzle and into the aircraft cabin. The method can further include at least restricting the formation of condensation on a target area of an external surface of the nozzle (which is exposed to air in the aircraft cabin) by directing a second flow of air to the target area. For example, in a particular embodiment, directing a second flow of air includes directing the second flow of air along the external surface to the target area. In another embodiment, directing the second flow of air includes directing the second flow of air through the external surface at the target area. In still a further embodiment, the method can include providing a layer of air adjacent to the target area that is dryer than air already present in the aircraft cabin.

DETAILED DESCRIPTION

Aspects of the present disclosure are directed to aircraft cabin airflow nozzles and associated systems and methods. Specific details of certain embodiments are described below with reference to FIGS. 2-6. Several details of structures or processes that are well-known and often associated with such methods and systems are not set forth in the following description for purposes of brevity. Moreover, although the following disclosure sets forth several embodiments of representative systems and methods, other embodiments can have different configurations and/or different components than those described in this section. Accordingly, the disclosure may have other embodiments with additional elements and/or without several of the elements described below with reference to FIGS. 2-6.

Figure 1:
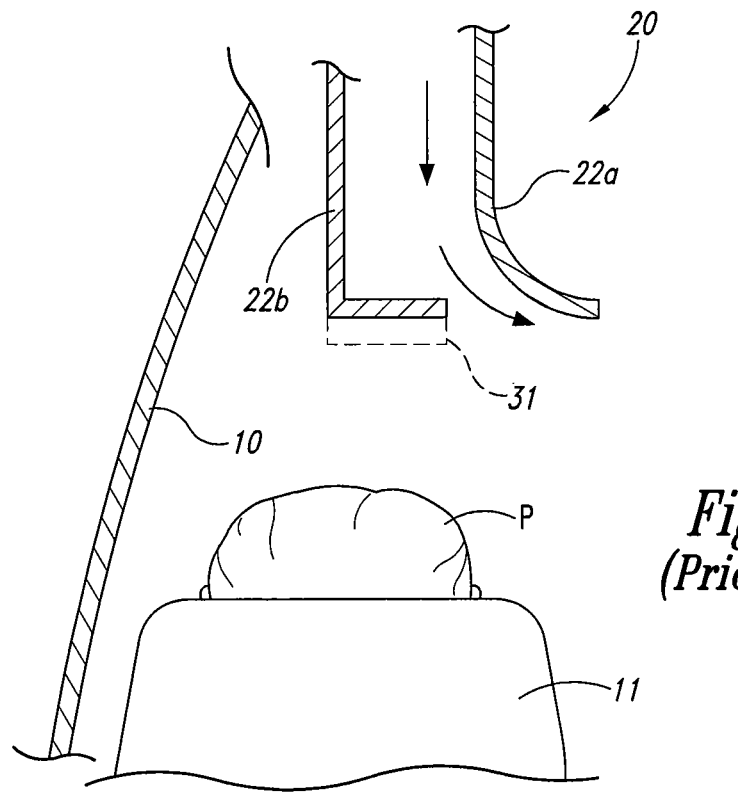
FIG. 1 is a partially schematic, cross-sectional illustration of a passenger cabin supply air nozzle configured in accordance with the prior art.
Figure 2:
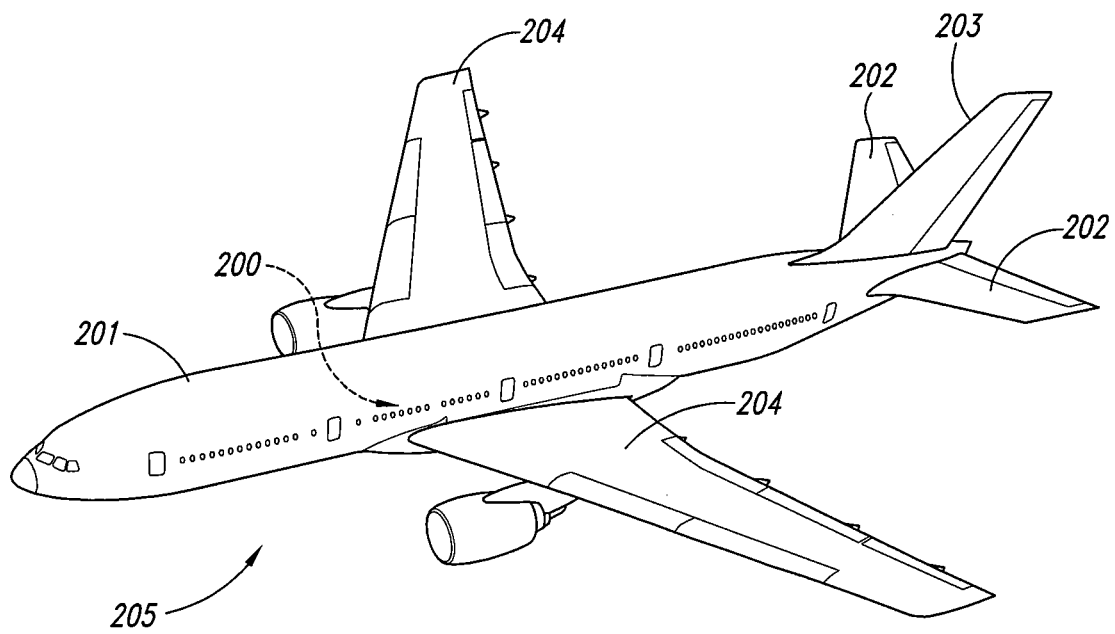
FIG. 2 is an isometric illustration of an aircraft including an air delivery system in accordance with the present disclosure.

FIG. 2 illustrates an aircraft 205 that houses and/or forms a portion of an overall aircraft system 200. The aircraft 205 includes a fuselage 201, wings 204, horizontal stabilizers 202, and a vertical stabilizer 203. The system 200 can include an environmental control system (ECS) that, among other functions, directs air into the passenger cabin located within the fuselage 201. As described further below, the system 200 can include features for directing the cabin airflow in a way that reduces or eliminates the formation of condensation on selected nozzle surfaces, including surfaces positioned above passenger seats.

Figure 3:
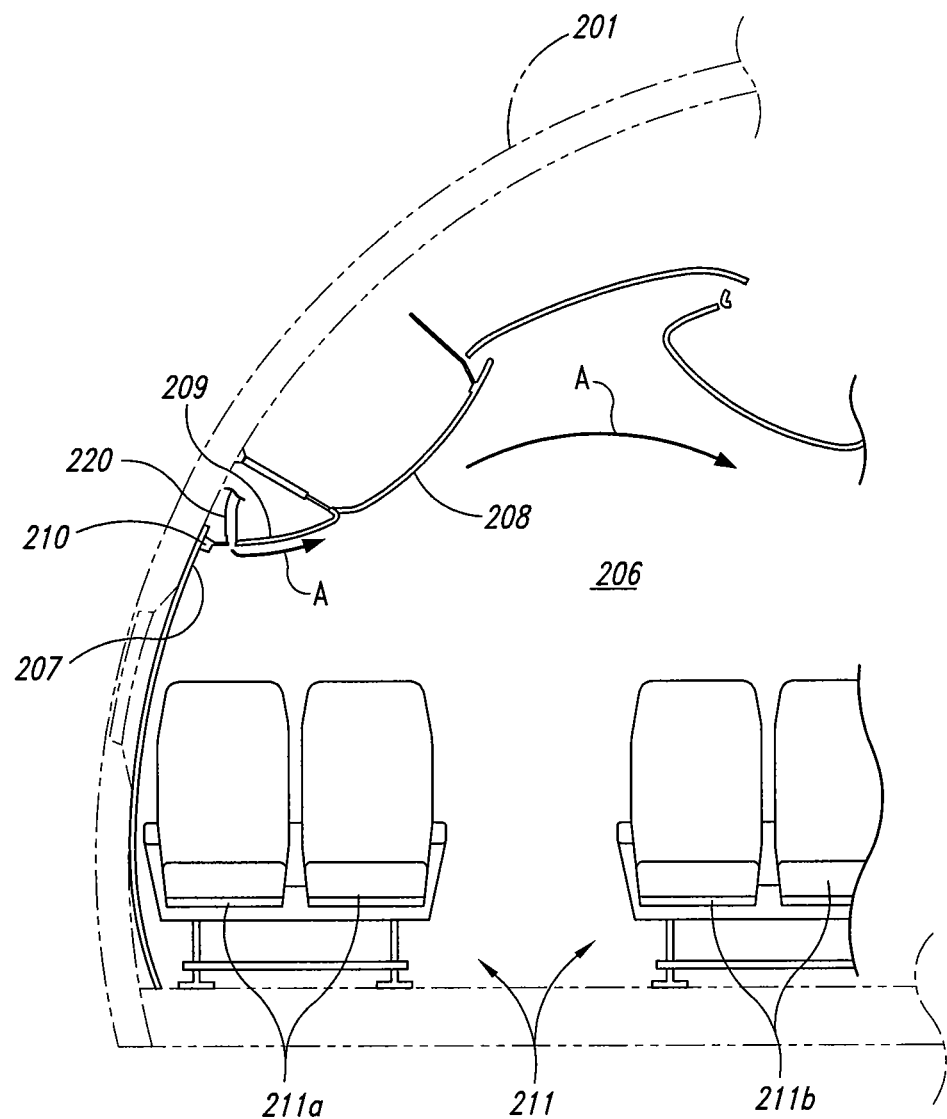
FIG. 3 is a cross-sectional illustration of an aircraft cabin having air supply nozzles configured in accordance with embodiments of the present disclosure.

FIG. 3 is a partially schematic, cross-sectional aft-looking illustration of the right half of the fuselage 201, illustrating a passenger cabin 206 having seats 211. The seats 211 can be arranged in a "2-4-2" configuration, as shown in FIG. 3, or other configurations in other embodiments. In any of these embodiments, the seats 211 can include outboard seats 211a located adjacent to an interior wall 207 of the cabin 206. A luggage bin 208 can be positioned above the outboard seats 211a, and a passenger service unit 209 can be located adjacent to the luggage bin 208. The passenger service unit 209 can include passenger-controlled features, such as an adjustable air flow nozzle, and a reading light.

Figure 4:
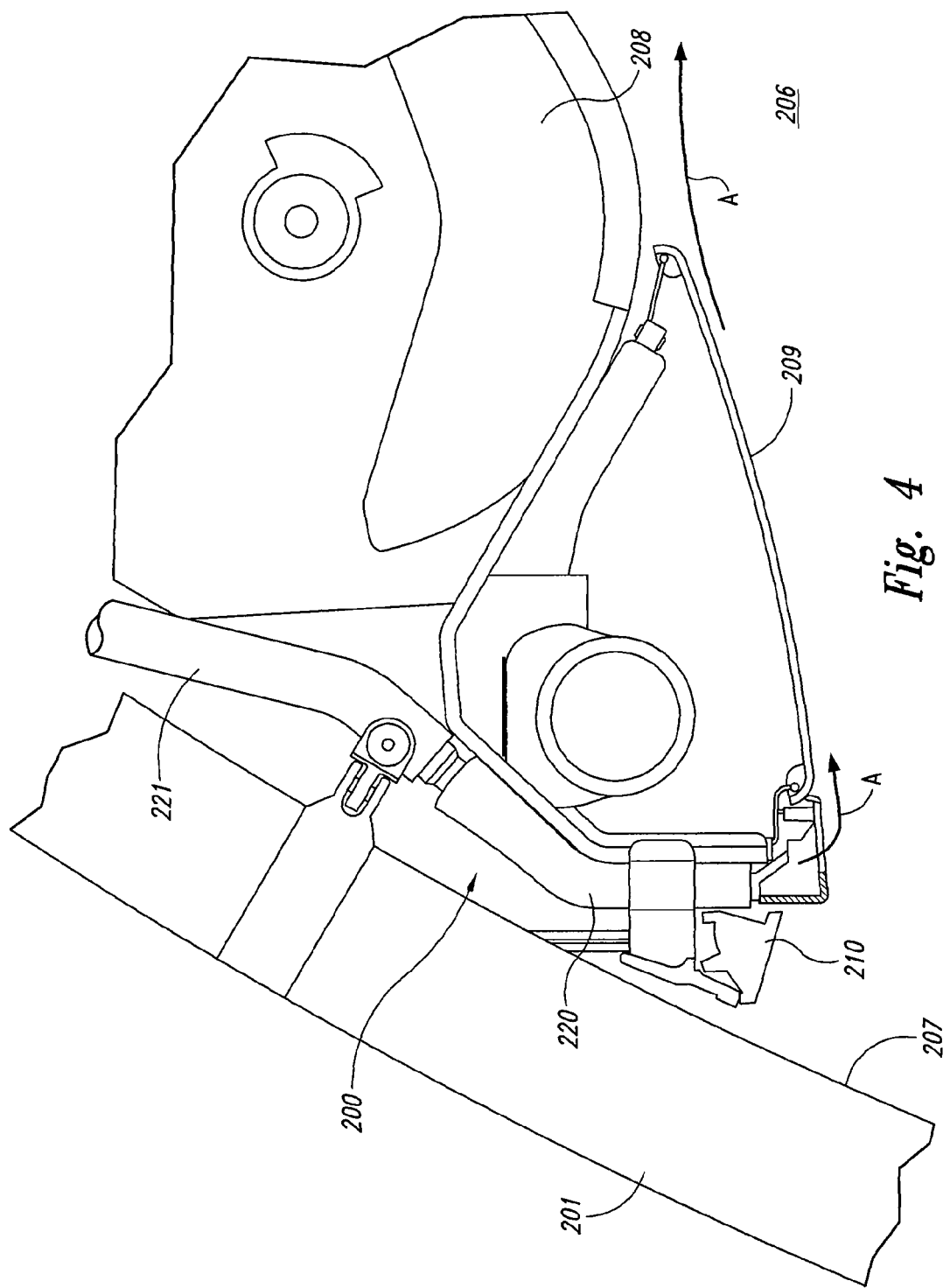
FIG. 4 is an enlarged illustration of a portion of the cabin shown in FIG. 3, including a nozzle configured in accordance with a particular embodiment of the present disclosure.
Figure 5:
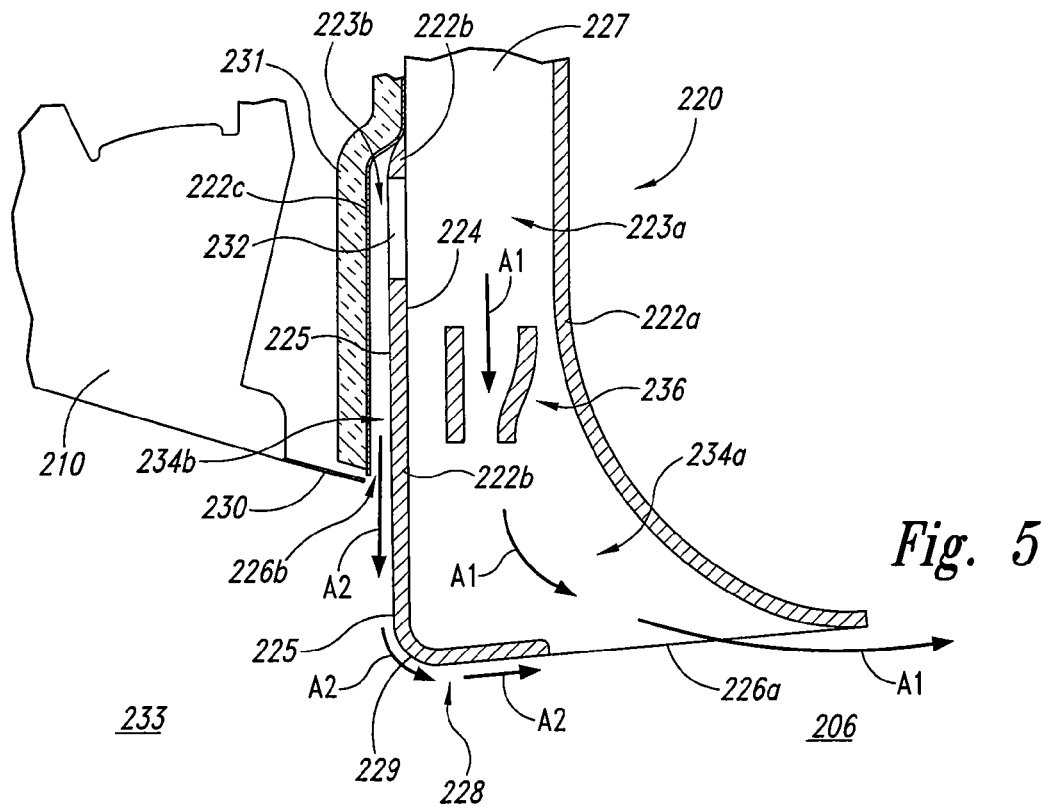
FIG. 5 is a further enlarged illustration of the nozzle shown in FIG. 4 having first and second flow passageways configured in accordance with a particular embodiment of the present disclosure.
Figure 6:
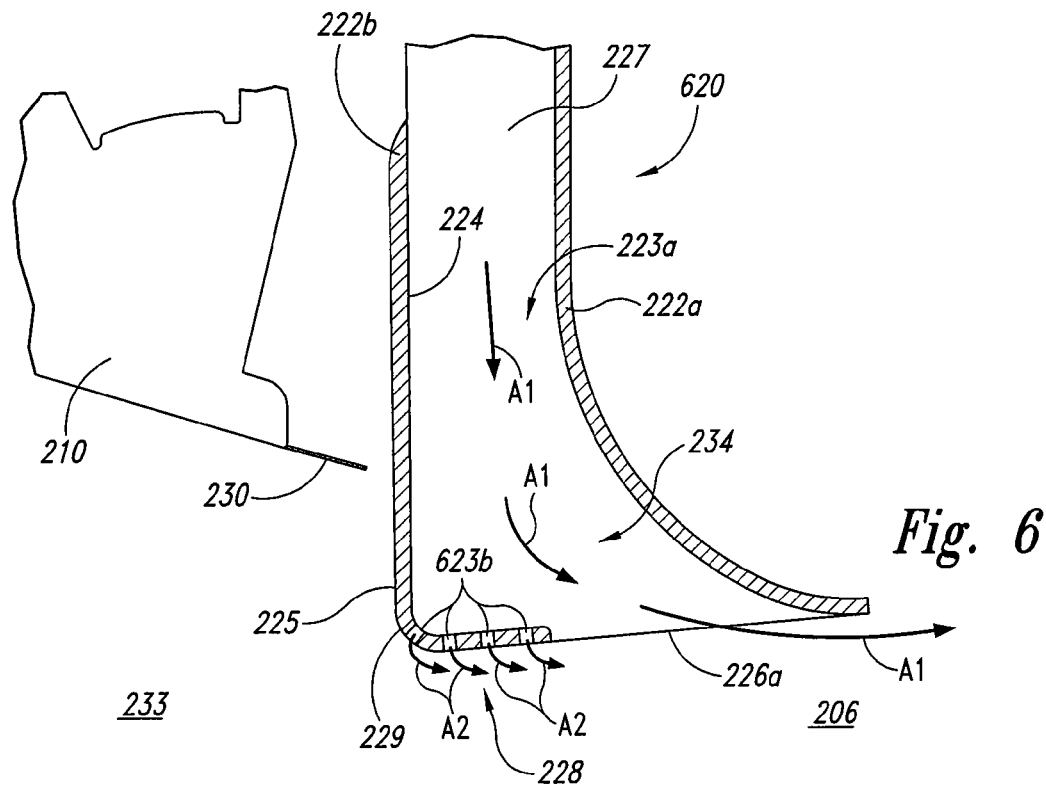
FIG. 6 is a partially schematic, cross-sectional illustration of a nozzle having multiple passageways extending through a nozzle surface in accordance with another embodiment of the present disclosure.

Other features located above the seats 211 are not passenger controlled. These can include a sidewall light 210 that provides indirect general cabin lighting, and a nozzle 220 that directs pressurized air into the cabin 206, independent of the passenger-controlled nozzles at the passenger service unit 209. The nozzle 220 is configured and oriented to direct the airflow inwardly toward the center of the cabin 206 (as indicated by arrows A) from positions along the axial length of the interior wall 207. This arrangement can provide a relatively large volume of air in a manner that recirculates the air over not only the outboard seats 211a, but over inboard seats 211b as well, and in a manner that does not impinge the air directly on the passengers below. FIGS. 4-6 illustrate further details of arrangements of the nozzle 220 in accordance with several embodiments of the present disclosure.

FIG. 4 is an enlarged illustration of the outboard portion of the cabin 206 shown in FIG. 3, and associated portions of the system 200. As shown in FIG. 4, the system 200 can include an air supply duct 221 that provides cool dry air to the nozzle 220. The supply duct 221 can have a generally circular cross-sectional shape, or other shapes, depending upon installation details. In general, the nozzle 220 can be flared or elongated in a direction generally transverse to the plane of FIG. 4 so as to extend axially along a portion of the cabin surface 207. For example, in a particular embodiment, each nozzle 220 has a length of about 24 inches, generally transverse to the plane of FIG. 4. Accordingly, multiple nozzles 220 are arranged along the length (or at least a portion of the length) of the fuselage 201 to provide a consistent flow of clean dry air into the cabin 206. Each nozzle 220 can be coupled to one or more supply ducts 221 to receive the air from a pressurized air source, e.g., a compressor driven by the main aircraft engines and/or an auxiliary power unit, or another suitable source.

FIG. 5 is a further enlarged, partially schematic cross-sectional illustration of an embodiment of the nozzle 220 shown in FIG. 4. In general, the nozzle 220 can include a first passageway 223a that provides a first flow 234a of supply air to the cabin 206 via a first exit 226a, as indicated by arrows A1. An auxiliary or second passageway 223b provides a second flow 234b of supply air to the cabin 206 via a second exit 226b, as indicated by arrows A2. The second flow 234b can be directed in a manner that restricts or prevents the formation of condensation on the surfaces of the nozzle 220 that are exposed to existing air 233 already present in the cabin 206.

In a particular arrangement shown in FIG. 5, the first passageway 223a is bounded in part by a first wall portion 222a and a second wall portion 222b. In a particular aspect of this arrangement, the first wall portion 222a can be positioned against and/or incorporated into the passenger service unit 209 (FIG. 4) while the second wall portion 222b can be exposed to the air 233 in the cabin 206. The second wall portion 222b can include a first surface 224 that faces inwardly and is wetted by the first flow 234a of supply air passing through the nozzle 220. The second wall portion 222b can also include a second or outer surface 225 that faces generally opposite the first surface 224. The second surface 225 can have a convexly curved region 229 which can form a portion of a target region 228. The target region 228 is exposed to air from the second passageway 223b, as described further below.

The second passageway 223b can be bounded in part by the second or outwardly facing surface 225 of the second wall portion 222b, and by a third wall portion 222c that is offset from the second wall portion 222b. The second passageway 223b receives a portion of the supply air 234 via an opening 232 in the second wall portion 222b. An (optional) flow straightener 236 can both guide the first flow 234a in the first passageway 223a, and provide back pressure that diverts some of the flow through the opening 232 and into the second passageway 223b. Accordingly, both the first passageway 223a and the second passageway 223b can receive air from a common upstream passageway 227. The second flow 234b passing through the second passageway 223b is directed through the second exit 226b and along the second surface 225, as indicated by arrows A2. Accordingly, the second exit 226b can be located upstream of the first exit 226a. Due to the Coanda effect, the second flow 234b passing out of the second exit 226b tends to follow the contour of the convexly curved region 229 as it passes along the target region 228, even if the target region 228 is inclined upwardly (as shown in FIG. 5), or is generally horizontal, or is inclined downwardly. Accordingly, the second passageway 223b can provide a sheet, curtain, layer and/or other volume of air that generally flows along the exposed second surface 225 at the target region 228.

The nozzle 220 can also include insulation 231 positioned along the outwardly facing surface of the third wall portion 222c to reduce or eliminate the likelihood for the sidewall light 210 to heat the cool, dry air passing through the second passageway 223b. A shield 230 can extend inwardly from the sidewall light 210 to cover both the insulation 231 and the downwardly-facing end of the third wall portion 222c, while leaving the second exit 226b open. This arrangement can visually shield the insulation 231 and the third wall portion 222c from passengers seated below.

In operation, embodiments of the nozzle 220 provide cool (e.g., 40° F.), dry air to the cabin 206 during some or all phases of a typical flight. The majority of the supply air provided by the nozzle 220 can be delivered via the first passageway 223a. For example, in a particular embodiment, at least 80% of the total airflow provided by the nozzle 220 passes through the first passageway 223a and into the cabin 206 via the first exit 226a. A smaller portion of the supply air 234 (e.g., up to about 20%) passes through the second passageway 223b and into the passenger cabin via the second exit 226b, as indicated by arrows A2. As described above, this air can pass along the exposed second surface 225, in particular at the target region 228.

One feature of an embodiment described above with reference to FIGS. 2-5 is that the second flow 234b of air can provide a barrier between the second surface 225 (e.g., an external surface) and the air 233 already in the cabin 206. Accordingly, the second flow 234b of air can restrict or prevent moisture in the cabin 206 from condensing on the second surface 225. As a result, the likelihood for droplets forming at the target region 228 (or other portions of the second surface 225) can be decreased or eliminated.

Another feature of at least some of the embodiments described above with reference to FIGS. 2-5 is that the third wall portion 222c and the (optional) insulation 231 can be hidden from passenger view by the shield 230. This in turn can create a more aesthetically appealing arrangement, and can also reduce the cost of manufacturing the nozzle 220. For example, the insulation 231 need not be painted or otherwise treated in a way that enhances its visual appearance because it need not be visible. The third wall portion 222c can be thin and lightweight (e.g., about 0.020 inches thick) and also does not require painting or surface finishing because it is hidden from passenger view.

Another feature of at least some of the foregoing embodiments is that the geometry of the nozzle 220 can generally be fixed throughout its operation. For example, air can be provided through both the first and second passageways 223a, 223b through all conditions over which the nozzle 220 operates. An advantage of the arrangement is that it can be simpler to design, build, operate and maintain than is a variable-geometry nozzle. At the same time, the nozzle 220 can provide a consistent, even flow of air to the cabin at all operating conditions, and the operator need not take any special actions directing the nozzle to operate differently during high cabin humidity conditions than during low cabin humidity conditions. Instead, the second flow of air can be provided to the passenger cabin during both high and low humidity operation, and in neither case is the second flow of air expected to require additional energy and/or detract from the ability of the nozzle to deliver a sufficient quantity of air to the cabin.

Nozzles in accordance within other embodiments can include other arrangements that use a portion of the supplied cool dry air to protect nozzle surfaces from contact with potentially moist cabin air. For example, referring now to FIG. 6, a nozzle 620 in accordance with another embodiment can include one or more second passageways 623b that extend through the second wall portion 222b from the first surface 224 to the second surface 225. In a particular embodiment, the second passageways 623b are located at the target region 228 (including the convexly curved region 229). In other embodiments, the second passageways 623b may be located upstream of the target region 228, in addition to or in lieu of being located at the target region 228. In any of these embodiments, a portion of the cool dry supply air passes through the second passageways 623b to form a curtain, protective layer or other volume of air adjacent to the second surface 225, thus restricting or eliminating contact between the second surface 225 and the potentially moist air 233 in the cabin 206.

In a particular embodiment, the second passageways 623b can include multiple perforations (e.g., laser-drilled perforations or perforations formed via other techniques) that deliver a sufficient quantity of air to the second surface 225, at velocities low enough to avoid distracting the passenger below. The second passageways 623b can be oriented generally normal to the first and second surfaces 224, 225 (as shown in FIG. 6), or they can be arranged at an inclined orientation to more particularly direct flow along the target region 628.

In other embodiments, the second passageway(s) 623b can have other configurations. For example, in a particular embodiment, the second passageway 623b can include one or more elongated slots extending through the second wall portion 222b. In still another embodiment, the second passageway 623b can be one of many convoluted passageways, formal, for example, by sintering the metal forming the second wall portion 222b.

From the foregoing, it will be appreciated that specific embodiments have been described herein for purposes of illustration, but that various modifications may be made in other embodiments. For example, the nozzles can have shapes and/or orientations different than those particularly described above, and/or can include other arrangements for providing a layer of air adjacent to exposed nozzle surfaces. Certain aspects described in the context of particular embodiments may be combined or eliminated in other embodiments. For example, in particular embodiments, the insulation shown in FIG. 5 may be eliminated. In other embodiments, the airflow provided by the second passageway 223b shown in FIG. 5 may be combined with airflow provided by the second passageways 623b shown in FIG. 6. Further, while advantages associated with certain embodiments have been described in the context of those embodiments, other embodiments may also exhibit such advantages, and not all embodiments need necessarily exhibit such advantages. Accordingly, embodiments of the disclosure are not limited except as by the appended claims.

We claim:

1. An aircraft system, comprising:
   an aircraft fuselage having an interior surface enclosing an aircraft cabin containing air;
   a plurality of cabin air nozzles carried by and spaced apart along a length of the aircraft fuselage, with individual nozzles including:
   a first air passageway bounded at least in part by a first wall portion and a second wall portion spaced apart from the first wall portion, the second wall portion being curved inwardly relative to the interior surface, the second wall portion having a first surface exposed to a first flow of air in the first passageway, and a second, outwardly exposed surface facing toward the cabin, exposed to the cabin air, and facing away from and aligned in parallel with the first surface, the first passageway having a first exit between the first and second wall portions; and
   a second air passageway having a second exit offset from the first exit in an upstream direction and positioned to direct a second flow of air along the second surface of the second wall portion, wherein both the first and second exits are intersected by a cross-sectional plane that intersects an adjacent wall of the aircraft cabin.

2. The system of claim 1, further comprising a common flow passageway coupled to and positioned upstream of the first and second air passageways, and wherein the first and second air passageways are parallel to each other upstream of the first and second exits.

3. The system of claim 1 wherein the second air passageway is bounded at least in part by the second surface of the second wall portion, and by a third wall portion spaced apart from the second surface.

4. The system of claim 3 wherein the second wall portion has an opening positioned to provide fluid communication between the first and second air passageways.

5. The system of claim 4 wherein the second air passageway is positioned to direct the second flow of air along a target region of the second surface, and wherein the opening is positioned upstream of the target region, and wherein the system further comprises a flow straightener and back pressure device positioned in the first air passageway downstream of the opening to divert flow into the opening.

6. The system of claim 1 wherein the second air passageway includes multiple openings extending through the second wall portion.

7. The system of claim 1 wherein the second air passageway is positioned to direct the second flow of air along a target region of the second surface, and wherein the target region of the second surface is generally horizontal.

8. The system of claim 1 wherein the second air passageway is positioned to direct the second flow of air along a target region of the second surface, and wherein the target region of the second surface is inclined upwardly in a direction of the flow along the target region.

9. The system of claim 1 wherein the second air passageway is positioned to direct the second flow of air along a target region of the second outwardly exposed surface, and wherein the target region of the second outwardly exposed surface is convexly curved.

10. The system of claim 1 wherein the first and second air passageways each have a fixed geometry.

11. The system of claim 1, further comprising a seat positioned adjacent to the interior surface, and wherein the first and second passageways are positioned over the seat and proximate to the interior surface.

12. The system of claim 1 wherein the second, outwardly exposed surface includes a first region oriented generally upwardly and a second region oriented generally laterally, and wherein the second exit is positioned to direct air along both the first and second regions of the second surface.

\* \* \* \* \*